Oct. 10, 1967   ØYSTEIN MYHR   3,345,760
PORTABLE INSTRUCTION AND DEMONSTRATION UNIT
WITH VARIOUS EQUIPMENT
Filed Oct. 19, 1964
FIG.5
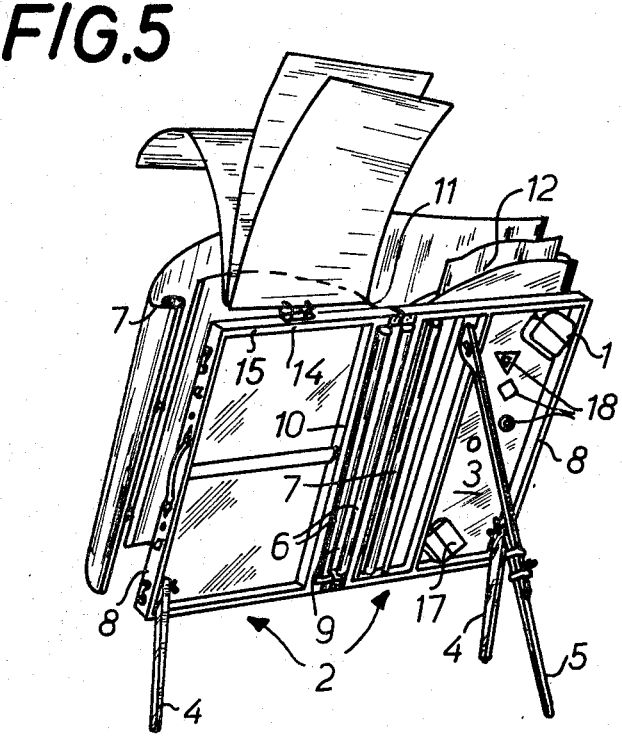
FIG.1   FIG.2   FIG.3   FIG.4
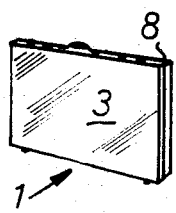 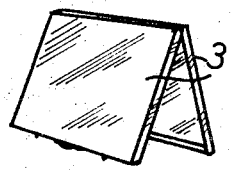 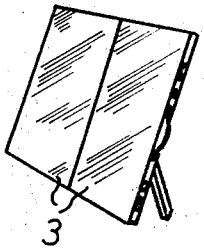 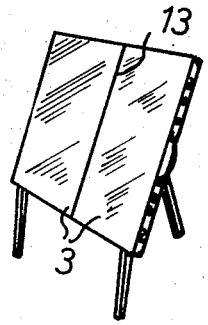
INVENTOR
ØYSTEIN MYHR
BY Young + Thompson
ATTORNEYS United States Patent Office 3,345,760
Patented Oct. 10, 1967

3,345,760
PORTABLE INSTRUCTION AND DEMONSTRA-
TION UNIT WITH VARIOUS EQUIPMENT
Øystein Myhr, Malm, Nord-Trøndelag, Norway
Filed Oct. 19, 1964, Ser. No. 404,644
3 Claims. (Cl. 35—60)

The present invention relates to a portable instruction and demonstration unit including various equipment.

Suit-cases, boxes and similar containers and covers for storing and transporting instruction and demonstration equipment, are previously known, e.g. comprising hinged boards, or instruction board units which may be detached from the carrying case or box, and disposed on the floor or on a table by means of supporting legs. Black-board arrangements fixed to the wall and equipped with rollers having covers which may be pulled across the surface of the board and rolled back onto the roller, are previously known. It is also known to use transparent covers which are pulled over drawings and other demonstration material fixed to the board, and which allow grease pencils to make additions or alterations or remarks on such drawings without destroying the original. Various supporting devices with swing-down legs adjustable as to length, are previously known, e.g. a field easel for painters, on which a board or other demonstration material may be mounted or hung, but to the best of the inventor's knowledge, a combined instruction and demonstration board comprising all the known features mentioned in the foregoing is not previously known.

The purpose of the invention is to provide a practical and light weight portable instruction and demonstration unit, which besides having instruction and demonstration equipment may also be utilized as an instruction board in two different sizes, and which board with suitable accessories may be used as a flannelograph and/or magnetic board.

This is achieved according to the invention by constructing a portable instruction and demonstration unit comprising a suit-case type main part, the two halves of which are substantially uniform and hinged in such a manner that when the one half is opened 180 degrees in relation to the other half, the two outer surfaces form a larger continuous surface. Further, the outer surfaces of the two suit-case type halves are made of a magnetic material, e.g. sheet steel treated with black-board paint allowing the surface to be used as an ordinary black-board or as a magnetic board with magnetic blocks. By means of flannel "curtains" rolled up on removable rollers mounted in both suit-case sections, the board surface may be transformed to serve as a flannelograph board, by the said flannel "curtain" being pulled off the roller, across the board surface and fastened at the opposite side of the board by suitable means. Furthermore, a double transparent plastic cover may be rolled up on one of the attached rollers, pulled out across the board surface and fastened at the opposite edge in the same manner, allowing an instructor to use a grease pencil for drawing or making amendments to drawings which are attached to the board underneath the plastic cover, or which are previously placed between the two plastic foils. A roller with film projector screen may also be removably mounted inside one of the two suit-case halves, and at the same time may be detached and mounted on one of the board's outer edges, pulled across the board and hooked onto a device on the opposite side, allowing the board to be used for projection of slides and films. Two of the removably mounted rollers with "curtains" may easily be attached to corresponding brackets in an outwardly facing opening, which opening is formed by the bottom of the case being pulled up slightly. The result attained hereby is that the flannel or plastic curtain may be pulled off the roller, over the edge of the board and across the half-board onto the opposite side for attachment, thus covering only one half of the board surface. By means of swinging-down and extensible legs, the board may be used on a table or on the floor. The unit may also be used as a double-sided board, i.e. the two suit-case halves may be opened and slightly parted in such a way that when they are placed on a horizontal surface, the two halves will support and steady each other. Rubber knobs have been suitably disposed in order to prevent the two case sections from sliding on or scratching the base surface when opened up as a board or closed as a unit.

The invention thus relates to a portable instruction and demonstration unit including equipment characterized in that the said unit is provided with a suit-case type container, the two outer side surfaces of which consist of a magnetized material adapted to be used as a black-board, further in that the suit-case type part contains instruction and demonstration equipment. Another feature is that the suit-case type part is made up of two uniform halves, hinged together in such a way that when the one half of the case is opened 180 degrees from closed position, the two side surfaces form one continuous surface intended for use as a black-board or demonstration surface. A further feature is that various suitable accessories are disposed in the case, such as removable rollers of the roller curtain type, on which have been rolled up sheets of for instance transparent plastic, flannel fabric, film screen, and that these removably mounted rollers are disposed in an opening created by raising the bottom of the case a certain distance. A further feature is that the "curtains" are adapted to be pulled out over the bottom edge of each suit-case half section, and affixed to the upper edge of the suit-case by suitable means, further that one of the removable rollers may be mounted on the exterior upper edge of one of the suit-case half sections by suitable means so that when the board has been fully unfolded and the two half parts form one continuous surface, the said curtain may then be unrolled from the roller and drawn across the entire board and fastened on the opposite side. A further feature comprises a ring binder mechanism mounted on a pivotable bracket, said bracket being detachably arranged on the outside edge of one of the suit-case halves, and allowing sheets of paper attached to the ring binder to hang freely on the back of the suit-case half section, or, if preferred, to be rotated and hang freely on the front surface of the board. A further feature is that if necessary, the flannel curtain may serve as a fluorescent screen in the following way: The flannel curtain is pulled off the roller through the middle opening created when the two half sections are not fully joined, across the one half board section and further extended beyond this, and the end of the screen may be easily tied to any suitable object within reach such as a chair, door handle etc. by means of a piece of string supplied and stored in the case. The instruction board is also provided with an aluminum tray which may be attached in a slightly inclined position on top of the board to hold any kind of paper, notes, lecture or demonstration materials etc. Further, swing-down legs, adjustable as to length, are attached to the interior of the two suit-case sections. The unit is also provided with a plastic slip cover having an open bottom and an opening for the handle. When pulled down over the unit this provides good protection for the board surfaces.

The present invention is described more fully in the following with reference to the drawing, where:

FIGURES 1–4 show the portable instruction and demonstration unit in various positions, as a closed case, small table instruction board, large table instruction board, large free-standing instruction board, respectively.

FIGURE 5 shows the opened-up unit as a free standing instruction board with various equipment, seen from behind.

The portable instruction and demonstration unit, hereinafter called the case 1, consists preferably of two uniform half-sections, formed by frames 2, with sides 3, constructed of a suitable material, the exterior surfaces of which have a glued-on or riveted-on thin steel plate, treated with blackboard paint. The case is provided with swing-down legs 4, together with an extensive supporting leg 5, allowing the case to stand up as a floor instruction board by means of and supported by all three legs, or to be used as a table model supported by the one supporting leg 5, as shown in FIGURES 3 and 4. By opening the case only slightly, it may be placed on a table and utilized as a small table model as shown in FIGURE 2. Rubber knobs are provided on the frame of the case to prevent it from sliding on and scratching the base surface, and such rubber knobs are also provided on the bottom sections to prevent protruding brackets and hinges from scratching the base surface upon which it is placed. In FIGURE 5 are shown the removable rollers 6 and 7 of the roller curtain type with rolled-on "curtains" of a material suitable for the purpose, for instance flannel, transparent plastic or film screen. The most practical method is to use the roller 7 for the film screen so that, as illustrated, it may be mounted with roller 7' on the upper edge 8 of the half section case, and from there pulled across the entire board surface 3, and affixed to the opposite side. The rollers 6 are mounted in a downwardly facing opening 9 at the bottom of the case, this opening being created by the bottom of the case or the lower part of the frame 10, having been pulled up slightly.

The two "curtains" 11 and 12, rolled up on the rollers 6, may thus be pulled through the crack or opening 13 created when the two half sections are closed or brought slightly together, the said opening 13 corresponding to the lower edge of the case 3 and the "curtains" may then be pulled further across the board surface and fastened at the opposite edge 8. The "curtains" 11 and 12 may be of flannel or double plastic transparent foil so that these may be used as a flannelograph or as a "pocket" for maps, pictures etc. This is achieved by inserting such articles between the plastic foils, pulling them out when necessary. For the storing of sheets of paper, illustrations, etc. there is a ring binder mechanism attached on pivotable bracket 14 removably attached to the side of the case 15 so that during transport the bracket is located inside the case holding the paper firmly against the side 15 or, during demonstration, as shown in FIGURE 5, the bracket 14 is located on the outside of the edge 15 in such a way that the sheets of paper held in the ring binder which is again attached to the bracket 14, will hang down on the back of the board or may be turned over and hang down on the front of the board. Holder mechanisms may be arranged on the back of the case for various equipment such as sponge 16, or chalk container 17, or magnetic blocks 18.

Thus, by the described lay-out and arrangement a lightweight, portable instruction and demonstration board unit with attached equipment is obtained, usable as an ordinary black-board, or a magnetic board with magnetic blocks. The described unit may also be utilized as a flannelograph board, as well as a demonstration board, using maps, drawings, brochures etc. by means of a transparent double-foil plastic "curtain," and thus teaching with the aid of display boards. An advantage also is the film screen which may be pulled all the way across the board surface for the showing of films and photographic slides. The film screen may be of blue flannel and thus serve as a flannelograph.

I claim:
1. A portable instruction demonstration unit comprising a suitcase-type carrying case containing instruction and demonstration equipment, said case comprising two sections hinged together in such a manner that when the sections swing open 180° from closed position, the exterior sides of the two sections form a continuous surface, at least one of said exterior sides comprising a magnetizable material, the bottom of the case where the two half sections are hinged together being pulled up a short distance to form recesses, rollers removably mounted in said recesses, curtains rolled on said rollers and adapted to be pulled over the bottom edge of each section between the sections and across said exterior sides, and means for releasably securing the ends of the curtains to the upper edges of the sections.

2. A portable instruction demonstration unit comprising a suitcase-type carrying case comprising two sections hinged together at widely spaced points on their bottom edges, said sections swinging open 180° from closed position to a position in which their exterior sides form a substantially continuous surface, a pair of rollers mounted inside said case one on each section and closely adjacent and parallel to the bottom edge of each section, and a curtain rolled on each said roller and of a width less than the distance between the points of hinged connection of the two sections to each other, whereby said curtains may be drawn from their rollers between said sections at the bottom of said sections and thence in opposite directions across said sides of the two sections and secured to the upper edges of said sections.

3. A portable instruction demonstration unit as claimed in claim 2, said points of hinged connection being closely adjacent the ends of the bottom edges of said sections, said curtains extending across most of the length of the lower edges of said sections.

References Cited
UNITED STATES PATENTS

| | | | |
|---|---|---|---|
| 1,273,940 | 8/1917 | Morrison | 40—86 |
| 2,188,612 | 1/1940 | Owen et al. | 40—85 |
| 2,205,692 | 6/1940 | Johnson et al. | 35—53 |
| 2,579,105 | 12/1951 | Baldine | 35—29 |
| 2,810,617 | 10/1957 | Slanhoff | 312—258 X |
| 2,867,045 | 1/1959 | Millgate | 35—60 |
| 3,174,629 | 3/1965 | Gelberg et al. | 35—60 X |

OTHER REFERENCES

Oravisual Company, Inc. of St. Petersburg, Fla., Catalogue No. 9. Only pages numbered 7 and 8 which depict "Giant Folding All Purpose Easel," copy 35 Bookcase, January 1964.

EUGENE R. CAPOZIO, *Primary Examiner.*

H. S. SKOGQUIST, *Assistant Examiner.*